United States Patent
Terada et al.

(10) Patent No.: US 11,059,549 B2
(45) Date of Patent: Jul. 13, 2021

(54) MARINE VESSEL AND MARINE VESSEL OPERATION SUPPORT DEVICE

(71) Applicant: YAMAHA HATSUDOKI KABUSHIKI KAISHA, Iwata (JP)

(72) Inventors: Kohei Terada, Shizuoka (JP);
Hirofumi Amma, Shizuoka (JP);
Yoshimasa Kinoshita, Shizuoka (JP);
Shimpei Fukumoto, Osaka (JP);
Mitsuaki Kurokawa, Osaka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/801,468

(22) Filed: Feb. 26, 2020

(65) Prior Publication Data
US 2020/0298940 A1    Sep. 24, 2020

(30) Foreign Application Priority Data

Mar. 19, 2019  (JP) .............................. JP2019-050974

(51) Int. Cl.
*B63B 49/00*    (2006.01)
*H04N 5/225*   (2006.01)
*H04N 7/18*     (2006.01)

(52) U.S. Cl.
CPC ........... *B63B 49/00* (2013.01); *H04N 5/2253* (2013.01); *H04N 7/183* (2013.01)

(58) Field of Classification Search
CPC .. G02B 5/3083; G02B 5/3025; G06T 19/006; H04N 5/2253
USPC ....................................................... 348/148
See application file for complete search history.

(56) References Cited

U.S. PATENT DOCUMENTS

| | | | |
|---|---|---|---|
| 2010/0001928 A1* | 1/2010 | Nutaro | G02B 27/017 345/8 |
| 2010/0225761 A1 | 9/2010 | Ishii | |
| 2013/0010118 A1 | 1/2013 | Miyoshi et al. | |
| 2015/0089434 A1* | 3/2015 | Akuzawa | B63H 25/02 715/773 |
| 2015/0350552 A1* | 12/2015 | Pryszo | G06T 11/206 348/143 |
| 2015/0365581 A1* | 12/2015 | Pryszo | H04N 5/23203 348/211.8 |
| 2016/0243986 A1* | 8/2016 | Ishiguro | H04N 7/181 |
| 2017/0323154 A1 | 11/2017 | Kollmann et al. | |
| 2019/0041222 A1* | 2/2019 | Grewal | G01C 21/265 |

FOREIGN PATENT DOCUMENTS

| | | | | |
|---|---|---|---|---|
| JP | 07-69271 A | 3/1995 | | |
| JP | 2010-041530 A | 2/2010 | | |
| JP | 2011-205513 A | 10/2011 | | |
| JP | 2015066978 A | * 4/2015 | | B63H 25/02 |
| JP | 6304519 B2 | 4/2018 | | |

* cited by examiner

*Primary Examiner* — Marnie A Matt
(74) *Attorney, Agent, or Firm* — Keating and Bennett, LLP

(57) ABSTRACT

A marine vessel includes a hull including a cabin, an imager that images a field-of-view shielded region, which is a region in which a marine vessel operator's field of view is obstructed when the marine vessel operator located on an operation seat provided inside the cabin looks around an outside of the marine vessel in a horizontal direction, and a display provided at a position visible from the operation seat and that displays a field-of-view complement image, which is an image of the field-of-view shielded region captured by the imager.

17 Claims, 5 Drawing Sheets

MARINE VESSEL AND MARINE VESSEL OPERATION SUPPORT DEVICE

CROSS REFERENCE TO RELATED APPLICATIONS

This application claims the benefit of priority to Japanese Patent Application No. 2019-050974 filed on Mar. 19, 2019. The entire contents of this application are hereby incorporated herein by reference.

BACKGROUND OF THE INVENTION

1. Field of the Invention

The present invention relates to a marine vessel and a marine vessel operation support device.

2. Description of the Related Art

A marine vessel including a cockpit is known in general. Such a marine vessel is disclosed in Japanese Patent Laid-Open No. 7-69271, for example.

Japanese Patent Laid-Open No. 7-69271 discloses a marine vessel in which a cabin is provided in a hull. In this marine vessel, a cockpit is disposed above the cabin. An awning (shading) supported by a plurality of pillars is provided in an upper portion of the cockpit. The marine vessel sails such that the wind passes between the cockpit and the awning in an upward-downward direction.

However, in the marine vessel disclosed in Japanese Patent Laid-Open No. 7-69271, the wind passes between the cockpit and the awning in the upward-downward direction, and thus the wind (rain when it rains) may blow against a marine vessel operator located in the cockpit. Furthermore, when the marine vessel disclosed in Japanese Patent Laid-Open No. 7-69271 is used in winter, the temperature of the outside air is relatively low, and thus the wind passes in the vicinity of the cockpit such that the temperature in the vicinity of the cockpit conceivably becomes relatively low.

Therefore, the cockpit may be disposed inside the cabin in order to significantly reduce or prevent the wind from blowing against the marine vessel operator and maintain the temperature in the vicinity of the cockpit at a more appropriate temperature. However, when the cockpit is provided inside the cabin, the marine vessel operator's field of view may be partially obstructed by structural members of the cabin when the marine vessel operator located in the cockpit sees outside of the marine vessel. Therefore, a marine vessel and a marine vessel operation support device that improve visibility to the outside of the marine vessel without a marine vessel operator moving his or her head or body even when a cockpit (operation seat) is disposed inside a cabin are desired.

SUMMARY OF THE INVENTION

Preferred embodiments of the present invention provide marine vessels and marine vessel operation support devices that each improve marine vessel operator's visibility to the outsides of the marine vessels even when operation seats are provided inside cabins.

A marine vessel according to a preferred embodiment of the present invention includes a hull including a cabin, an imager that images a field-of-view shielded region, which is a region in which a marine vessel operator's field of view is obstructed when the marine vessel operator located on an operation seat provided inside the cabin looks around an outside of the marine vessel in a horizontal direction, and a display provided at a position visible from the operation seat and that displays a field-of-view complement image, which is an image of the field-of-view shielded region captured by the imager.

A marine vessel according to a preferred embodiment of the present invention includes the imager that images the field-of-view shielded region and the display provided at the position visible from the operation seat and that displays the field-of-view complement image, which is the image of the field-of-view shielded region. Accordingly, the image of the field-of-view shielded region is visually recognized by the marine vessel operator located on the operation seat provided inside the cabin, and thus the marine vessel operator's field of view is complemented. Consequently, even when the operation seat is provided inside the cabin, marine vessel operator's visibility to the outside of the marine vessel is improved without greatly changing the designs or shapes of the cabin and members inside the cabin. Furthermore, the operation seat is provided inside the cabin, and thus blowing of the wind against the marine vessel operator is significantly reduced or prevented, and the temperature adjacent to or in a vicinity of the operation seat is easily maintained at an appropriate temperature.

In a marine vessel according to a preferred embodiment of the present invention, the display is preferably located adjacent to or in a vicinity of the operation seat, for example. Accordingly, the marine vessel operator located on the operation seat easily visually recognizes the display provided adjacent to or in a vicinity of the operation seat. Note that "adjacent to or in a vicinity of the operation seat" refers to a position inside the cabin and visible from the operation seat.

In a marine vessel according to a preferred embodiment of the present invention, for example, the imager preferably images at least a front portion of the field-of-view shielded region, and the display preferably displays the field-of-view complement image including an image of the front portion of the field-of-view shielded region. Accordingly, the marine vessel operator's field of view is complemented when the marine vessel is traveling forward. Consequently, when the marine vessel operator is operating the marine vessel in the cabin and the marine vessel moves forward (during sailing), the marine vessel operator's visibility to the outside of the marine vessel is improved.

The imager preferably images a rear portion of the field-of-view shielded region in addition to the front portion of the field-of-view shielded region, and the display preferably displays the field-of-view complement image including the image of the front portion of the field-of-view shielded region and an image of the rear portion of the field-of-view shielded region, for example. Accordingly, the marine vessel operator's visibility to the outside of the marine vessel not only forward of the hull but also rearward of the hull is improved.

In a marine vessel including the display that displays the field-of-view complement image, the cabin preferably includes a window in front of the operation seat, and the front portion of the field-of-view shielded region preferably includes the region in which the marine vessel operator's field of view is obstructed when the marine vessel operator looks at the outside of the marine vessel in the horizontal direction from a height of a center point of the window in a vertical direction, the center point being located above the operation seat, for example. Accordingly, the field of view of the marine vessel operator located on the operation seat and who is visually recognizing the window is complemented. Consequently, the marine vessel operation of the marine vessel operator is effectively supported when the marine vessel travels forward.

In a marine vessel including the cabin including the window, the imager preferably images a rear portion of the field-of-view shielded region in addition to the front portion of the field-of-view shielded region, the front portion of the field-of-view shielded region preferably includes a first region obstructed by a front shield including a front pillar of the cabin, and the rear portion of the field-of-view shielded region preferably includes a second region obstructed by a rear shield including a rear wall of the cabin, for example. Accordingly, the marine vessel operator's field of view obstructed by the shield of the cabin is complemented. Consequently, the operation seat is provided inside the cabin such that even when the field-of-view shielded region is generated due to components or elements of the cabin, the marine vessel operator's field of view is effectively complemented.

In a marine vessel according to a preferred embodiment of the present invention, a sum of angular ranges of the field-of-view shielded region in the horizontal direction around the operation seat in a plan view is preferably about 90 degrees or more and about 360 degrees or less, for example. Accordingly, when the marine vessel operator located on the operation seat looks over in the horizontal direction, the marine vessel operator's field of view is complemented even when the field-of-view shielded region is relatively large (for example, even when the sum of the angular ranges is about 90 degrees or more). Consequently, as compared with a case in which the field-of-view shielded region is relatively small (for example, the sum of the angular ranges is less than about 90 degrees), the marine vessel operation of the marine vessel operator is more effectively supported.

The sum of the angular ranges of the field-of-view shielded region is preferably about 180 degrees or more and about 360 degrees or less, for example. Accordingly, even when the field-of-view shielded region is even larger (when the sum of the angular ranges is about 180 degrees or more), the marine vessel operator's field of view is complemented. Consequently, the marine vessel operation of the marine vessel operator is more effectively supported.

In a marine vessel according to a preferred embodiment of the present invention, a sum of angular ranges of the field-of-view shielded region in the horizontal direction around the operation seat in a plan view is preferably about 60 degrees or more and about 180 degrees or less within the field-of-view shielded region forward of the operation seat, for example. Accordingly, even when the front portion of the field-of-view shielded region is relatively large (for example, even when the sum of the angular ranges is about 60 degrees or more), the marine vessel operator's visibility to an area forward of the hull is improved without greatly changing the designs or shapes of front structural members of the cabin and the members provided inside the cabin.

In a marine vessel according to a preferred embodiment of the present invention, a sum of angular ranges of the field-of-view shielded region in the horizontal direction around the operation seat in a plan view is preferably about 60 degrees or more and about 180 degrees or less within the field-of-view shielded region rearward of the operation seat, for example. Accordingly, even when the rear portion of the field-of-view shielded region is relatively large (the sum of the angular ranges is about 60 degrees or more), the marine vessel operator's visibility to an area rearward of the hull is improved without greatly changing the designs or shapes of rear structural members of the cabin and the members provided inside the cabin.

In a marine vessel according to a preferred embodiment of the present invention, a sum of angular ranges of the field-of-view shielded region in the horizontal direction around the operation seat in a plan view is preferably about 60 degrees or more and about 180 degrees or less within the field-of-view shielded region leftward or rightward of the operation seat, for example. Accordingly, even when the left or right field-of-view shielded region is relatively large (the sum of the angular ranges is about 60 degrees or more), the marine vessel operator's visibility to an area leftward or rightward of the hull is improved without greatly changing the designs or shapes of left or right structural members of the cabin and the members provided inside the cabin.

The sum of the angular ranges of the field-of-view shielded region in the horizontal direction around the operation seat in the plan view is preferably about 120 degrees or more and about 180 degrees or less within the field-of-view shielded region leftward or rightward of the operation seat, for example. Accordingly, even when the left or right field-of-view shielded region is even larger (the sum of the angular ranges is about 120 degrees or more), the marine vessel operator's visibility to the area leftward or rightward of the hull is improved without greatly changing the designs or shapes of the left or right structural members of the cabin and the members provided inside the cabin.

In a marine vessel according to a preferred embodiment of the present invention, the display is preferably provided on a shield that generates the field-of-view shielded region, for example. Accordingly, a region in which the shield is located is effectively used.

The display preferably displays the field-of-view complement image including the image of the field-of-view shielded region generated due to the shield on which the display is provided. Accordingly, the marine vessel operator visually recognizes the field-of-view complement image and is able to see through the shield, and thus the marine vessel operator's visibility to the outside of the marine vessel is further improved.

In a marine vessel in which the display is provided on the shield, the display is preferably provided, for example, on a surface of the shield on a side of the operation seat. Accordingly, the display is provided on the surface of the shield on the side of the operation seat while the region in which the shield is provided is effectively used such that the marine vessel operator located on the operation seat more easily recognizes the display.

In a marine vessel according to a preferred embodiment of the present invention, the display is preferably provided, for example, inside the cabin at a position at which the display is viewable by the marine vessel operator located on the operation seat when the marine vessel operator looks at the outside of the marine vessel at least in a forward and horizontal direction. Accordingly, the marine vessel operator who is looking forward visually recognizes the display. Consequently, the visibility, to the outside of the marine vessel, of the marine vessel operator who is operating the marine vessel while looking forward is improved.

The display is preferably provided, for example, over an entire inner periphery of the cabin. Accordingly, the marine vessel operator's field of view is complemented over the entire inner periphery of the cabin. That is, when looking over the entire inner periphery of the cabin, the marine vessel operator visually recognizes an image showing the entire field-of-view shielded region.

A marine vessel operation support device according to a preferred embodiment of the present invention includes an imager that images a field-of-view shielded region, which is a region in which a marine vessel operator's field of view is obstructed when the marine vessel operator located on an operation seat provided inside a cabin looks around an outside of a marine vessel in a horizontal direction, and a display provided at a position visible from the operation seat and that displays a field-of-view complement image, which is an image of the field-of-view shielded region captured by the imager.

In a marine vessel operation support device according to a preferred embodiment of the present invention, even when the operation seat is provided inside the cabin, marine vessel operator's visibility to the outside of the marine vessel is improved.

In a marine vessel operation support device according to a preferred embodiment of the present invention, the display is preferably provided, for example, adjacent to or in a vicinity of the operation seat. Accordingly, the marine vessel operator located on the operation seat easily visually recognizes the display provided adjacent to or in a vicinity of the operation seat.

In a marine vessel operation support device according to a preferred embodiment of the present invention, the imager preferably images at least a front portion of the field-of-view shielded region, and the display preferably displays the field-of-view complement image including an image of the front portion of the field-of-view shielded region, for example. Accordingly, the marine vessel operator's field of view is complemented when the marine vessel is traveling forward. Consequently, when the marine vessel operator is operating the marine vessel in the cabin and the marine vessel moves forward (during sailing), the marine vessel operator's visibility to the outside of the marine vessel is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is now described with reference to FIGS. 1 to 8. The marine vessel 100 is a small marine vessel, for example.

Figure 1:
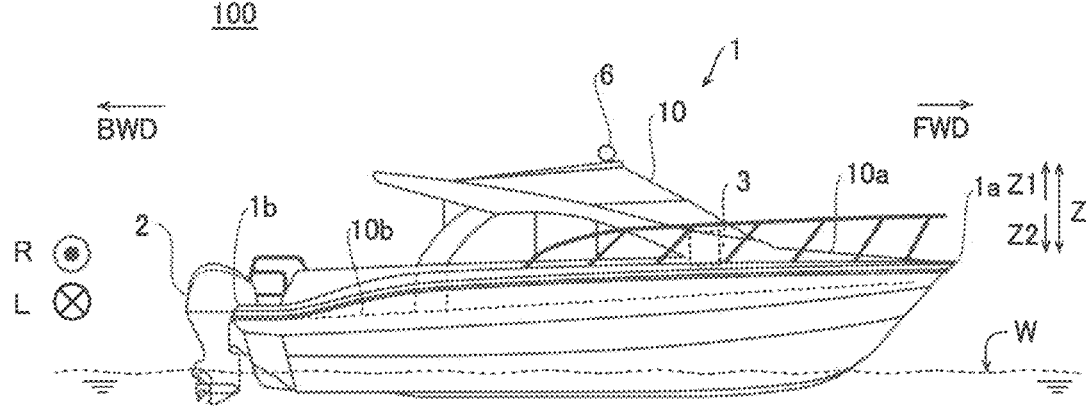
FIG. 1 is a side view showing the structure of a marine vessel according to a first preferred embodiment of the present invention.
Figure 2:
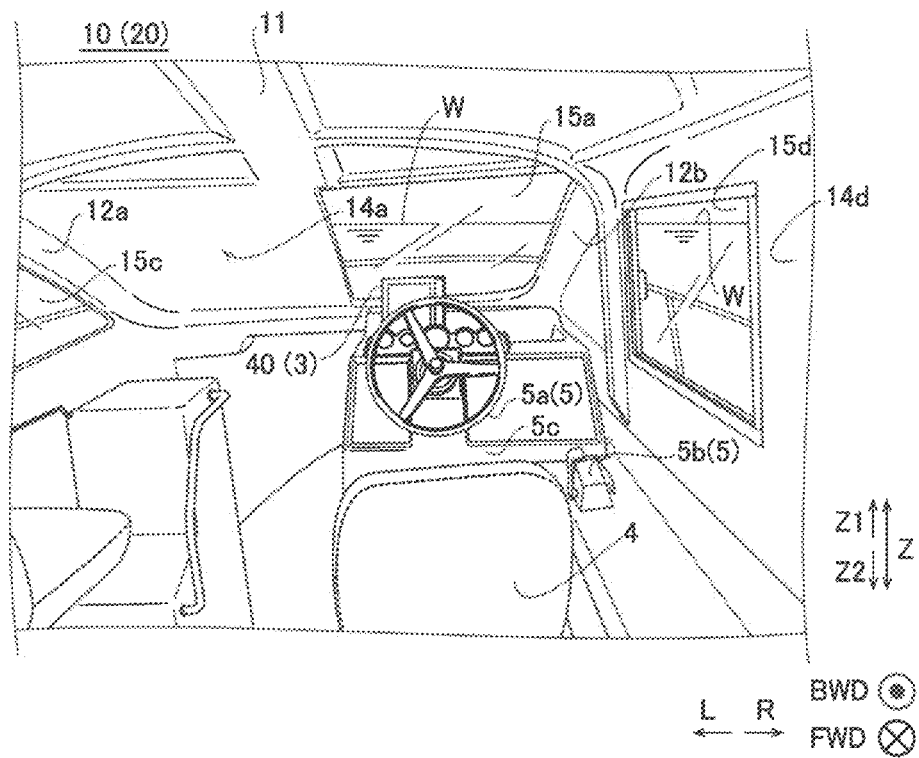
FIG. 2 is a diagram showing the interior of a cabin according to the first preferred embodiment of the present invention as viewed in a forward direction.

As shown in FIG. 1, the marine vessel 100 includes a hull 1, a propulsion device 2, and a marine vessel operation support device 3. The hull 1 includes a cabin 10 at an upper portion thereof. Furthermore, the hull 1 includes a front deck 10a in front of the cabin 10, and a rear deck 10b behind the cabin 10. As shown in FIG. 2, an operation seat 4 and a marine vessel operation unit 5 provided adjacent to or in a vicinity of the operation seat 4 are provided inside the cabin 10. The marine vessel operation unit 5 includes a steering operator 5a and a remote control 5b. The steering operator 5a preferably is provided on a console 5c located in front of the operation seat 4. The front deck 10a and the rear deck 10b are examples of a "shield".

In the present specification, the term "front (forward)" refers to a direction indicated by "FWD" in the figures and the forward movement direction (the bow 1a side of the hull 1) of the marine vessel 100. The term "rear (rearward, behind)" refers to a direction indicated by "BWD" in the figures and the reverse movement direction (the stern 1b side of the hull 1) of the marine vessel 100. Furthermore, the term "left (leftward)" refers to a direction indicated by "L" in the figures and a portside 1c (see FIG. 6) of the hull 1. The term "right (rightward)" refers to a direction indicated by "R" in the figures and the starboard side 1d (see FIG. 6) of the hull 1. A "vertical direction" refers to a direction indicated by "Z" in FIG. 1. The term "upper (upward, above)" refers to a direction indicated by "Z1" in FIG. 1, and the term "lower (downward, below)" refers to a direction indicated by "Z2" in FIG. 1.

Figure 3:
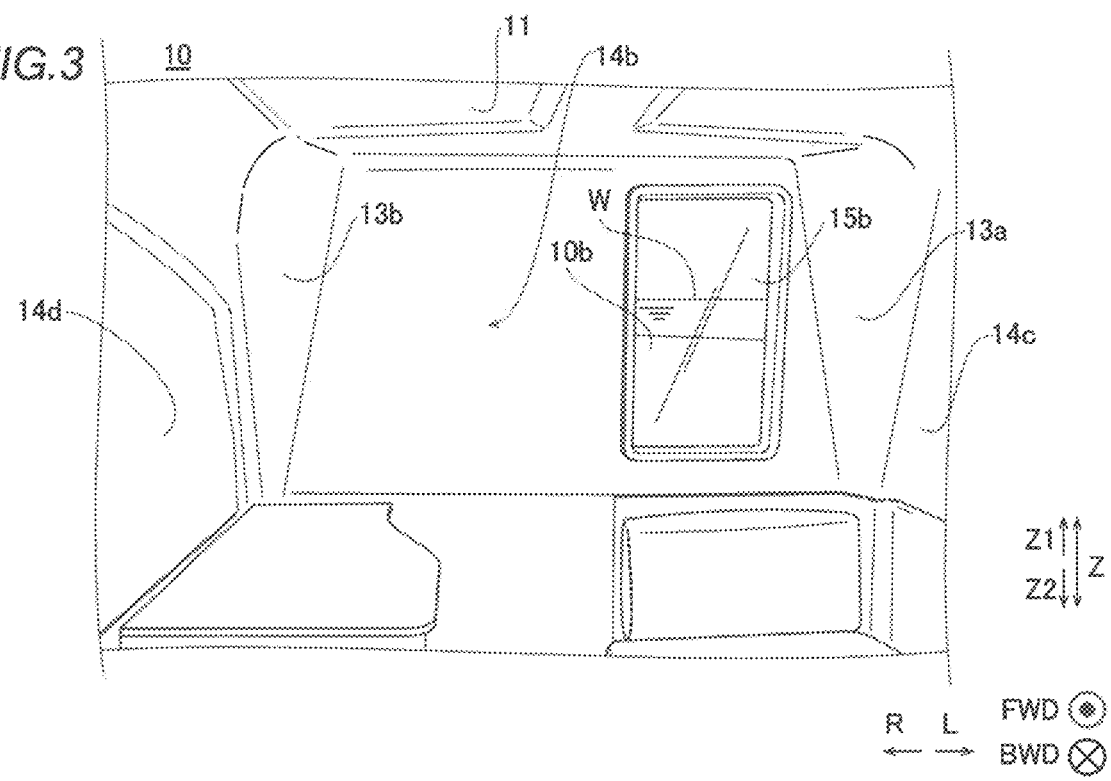
FIG. 3 is a diagram showing the interior of the cabin according to the first preferred embodiment of the present invention as viewed in a rearward direction.

As shown in FIGS. 2 and 3, the cabin 10 is box-shaped. The cabin 10 includes a pair of front pillars 12a and 12b and a pair of rear pillars 13a and 13b that support the upper surface 11 of the cabin 10, a front wall 14a, a rear wall 14b, and a left wall 14c, and a right wall 14d. The pair of front pillars 12a and 12b, the pair of rear pillars 13a and 13b, the front wall 14a, the rear wall 14b, the left wall 14c, and the right wall 14d are examples of a "shield". The pair of front pillars 12a and 12b, the pair of rear pillars 13a and 13b, the front wall 14a, the rear wall 14b, the left wall 14c, and the right wall 14*d* are described below as a shield 20 when these features are not particularly different from one another.

As shown in FIG. 2, the front pillar 12*a* extends in a substantially upward-downward direction in a front left portion of the cabin 10. The front pillar 12*b* extends in a direction similar to the substantially upward-downward direction in a front right portion of the cabin 10. The front wall 14*a* is provided between the pair of front pillars 12*a* and 12*b* in a horizontal direction (left-right direction).

As shown in FIG. 3, the rear pillar 13*a* extends in a direction similar to the substantially upward-downward direction in a rear left portion of the cabin 10. The rear pillar 13*b* also extends in a direction similar to the substantially upward-downward direction in a rear right portion of the cabin 10. The rear wall 14*b* is provided between the pair of rear pillars 13*a* and 13*b* in the horizontal direction (left-right direction).

Figure 4:
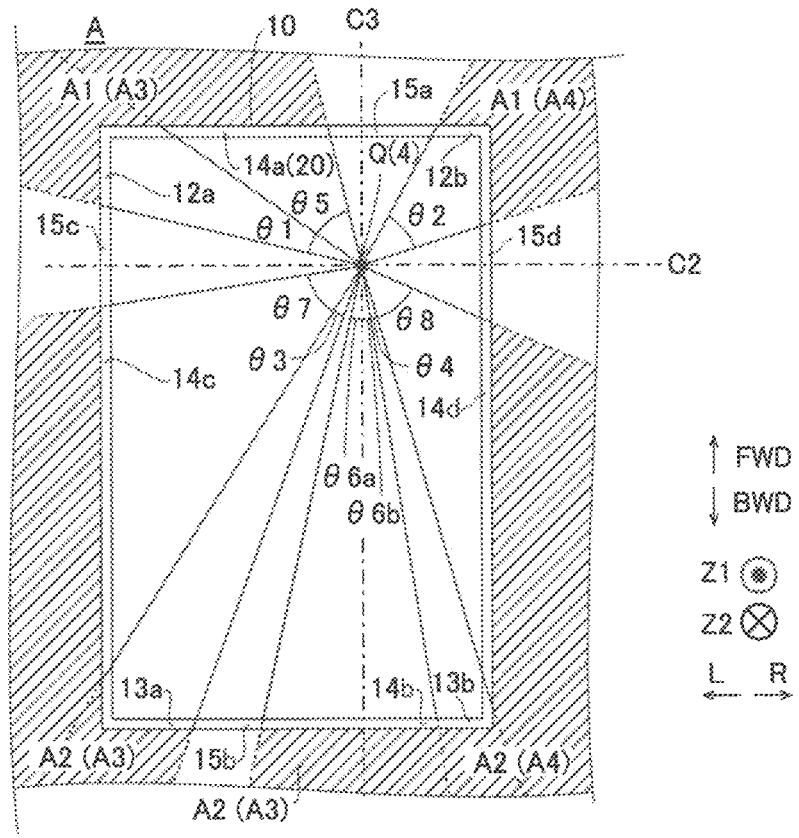
FIG. 4 is a view showing a field-of-view shielded region according to the first preferred embodiment of the present invention.

As shown in FIG. 4, the left wall 14*c* is provided between the front pillar 12*a* and the rear pillar 13*a* in a horizontal direction (forward-rearward direction). The right wall 14*d* is provided between the front pillar 12*b* and the rear pillar 13*b* in the horizontal direction (forward-rearward direction). Furthermore, the cabin 10 includes a front window 15*a*, a rear window 15*b*, a left window 15*c*, and a right window 15*d*. A pane of glass is provided in each of the front window 15*a*, the rear window 15*b*, the left window 15*c*, and the right window 15*d*. Thus, the front window 15*a*, the rear window 15*b*, the left window 15*c*, and the right window 15*d* significantly reduce or prevent ventilation between the inside and outside of the cabin 10 and also transmit light from the outside of the hull 1 into the cabin 10 (that is, to enable a marine vessel operator to view the outside of the hull 1 from the inside of the cabin 10). Note that W in FIGS. 1-3 represents a water surface.

As shown in FIG. 2, the front window 15*a* is provided between the pair of front pillars 12*a* and 12*b* in the left-right direction, in front of the operation seat 4, and above the console 5*c*. The front window 15*a* is provided adjacent to or in a vicinity of the front wall 14*a* in the left-right direction. The left window 15*c* is provided between the front pillar 12*a* and the rear pillar 13*a* in the horizontal direction and leftward of the operation seat 4. The left window 15*c* is provided adjacent to or in a vicinity of the left wall 14*c* (see FIG. 4) in the forward-rearward direction. The right window 15*d* is provided between the front pillar 12*b* and the rear pillar 13*b* in the forward-rearward direction and rightward of the operation seat 4. The right window 15*d* is provided adjacent to or in a vicinity of the right wall 14*d* (see FIG. 4) in the forward-rearward direction.

As shown in FIG. 3, the rear window 15*b* is provided between the pair of rear pillars 13*a* and 13*b* in the left-right direction and behind the operation seat 4 (see FIG. 4). The rear window 15*b* is provided adjacent to or in a vicinity of the rear wall 14*b* in the left-right direction.

The propulsion device 2 is provided at the stern 1*b*, as shown in FIG. 1. The propulsion force of the propulsion device 2 is changed based on an operation performed on the marine vessel operation unit 5 by a marine vessel operator. In addition, the marine vessel 100 is steered based on an operation performed on the marine vessel operation unit 5 by the marine vessel operator.

The marine vessel operation unit 5 changes the direction of a propulsion force generated by the propulsion device 2. The marine vessel operation unit 5 includes the steering operator 5*a*, the remote control 5*b*, and a joystick, for example.

Figure 5:
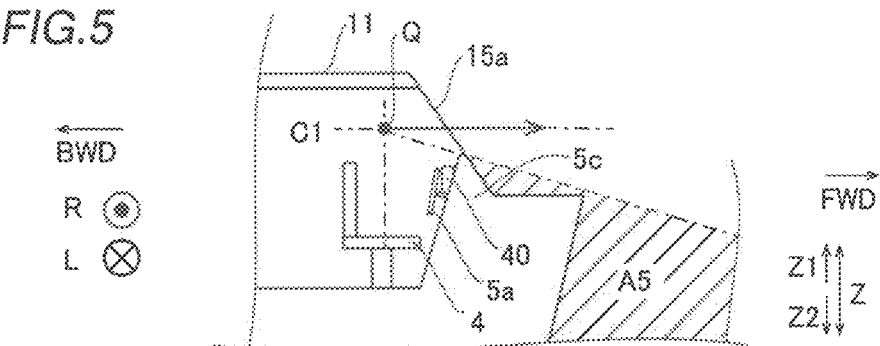
FIG. 5 is a view showing a marine vessel operator's viewpoint according to the first preferred embodiment of the present invention.

As shown in FIG. 4, a field-of-view shielded region A (a hatched portion in FIG. 4), which is a region in which the marine vessel operator's field of view is obstructed when the marine vessel operator (marine vessel operator's viewpoint Q) located on the operation seat 4 provided inside the cabin 10 looks around the outside of the hull 1 in the horizontal direction, is generated due to a structure (shield 20) of the hull 1. That is, the field-of-view shielded region A is a region outside (farther than) the shield 20 as viewed from the marine vessel operator's viewpoint Q. As shown in FIG. 5, the marine vessel operator's viewpoint Q is a point inside the cabin 10 and located above the operation seat 4, at which the marine vessel operator looks at the outside of the hull 1 in the horizontal direction from the height of a center position C1 of the front window 15*a* in the vertical direction. In the following description, the field-of-view shielded region A is simply described as a "region A".

Specifically, due to the pair of front pillars 12*a* and 12*b* and the front wall 14*a*, a front field-of-view shielded region A1 (hereinafter referred to as a "region A1") is generated. Due to the pair of rear pillars 13*a* and 13*b* and the rear wall 14*b*, a rear portion of the field-of-view shielded region A2 (hereinafter referred to as a "region A2") is generated. Due to the front pillar 12*a*, the rear pillar 13*a*, and the left wall 14*c*, a left field-of-view shielded region A3 (hereinafter referred to as a "region A3") is generated. Due to the front pillar 12*b*, the rear pillar 13*b*, and the right wall 14*d*, a right field-of-view shielded region A4 (hereinafter referred to as a "region A4") is generated. The region A1 is a portion of the region A forward of the position C2 of the marine vessel operator's viewpoint Q (operation seat 4) in the forward-rearward direction. The region A2 is a portion of the region A rearward of the position C2. The region A3 is a portion of the region A leftward of the position C3 of the marine vessel operator's viewpoint Q (operation seat 4) in the left-right direction. The region A4 is a portion of the region A rightward of the position C3.

As shown in FIG. 4, in the first preferred embodiment, the sum of angular ranges $\theta 1$ to $\theta 8$ of the region A in the horizontal direction around the operation seat 4 in a plan view is about 90 degrees or more and about 360 degrees or less. That is, the sum of the angular range $\theta 1$ of the region A1 (A3) generated due to the front pillar 12*a*, the angular range $\theta 2$ of the region A1 (A4) generated due to the front pillar 12*b*, the angular range $\theta 3$ of the region A2 (A3) generated due to the rear pillar 13*a*, the angular range $\theta 4$ of the region A2 (A4) generated due to the rear pillar 13*b*, the angular range $\theta 5$ of the region A1 (A3) generated due to the front wall 14*a*, the angular ranges $\theta 6a$ and $\theta 6b$ of the region A2 (A4) generated due to the rear wall 14*b*, the angular range $\theta 7$ of the region A2 (A3) generated due to the left wall 14*c*, and the angular range $\theta 8$ of the region A2 (A4) generated due to the right wall 14*d* around the marine vessel operator's viewpoint Q is about 90 degrees or more and about 360 degrees or less. Preferably, for example, the sum of the angular ranges $\theta 1$ to $\theta 8$ is about 180 degrees or more and about 360 degrees or less.

In the region A1, the sum of the angular ranges $\theta 1$, $\theta 2$, and $\theta 5$ is about 60 degrees or more and about 180 degrees or less. In the region A2, the sum of the angular ranges $\theta 3$, $\theta 4$, $\theta 6a$, $\theta 6b$, $\theta 7$, and $\theta 8$ is about 60 degrees or more and about 180 degrees or less. In the region A3, the sum of the angular ranges $\theta 1$, $\theta 3$, $\theta 5$, $\theta 6a$, and $\theta 7$ is about 60 degrees or more and about 180 degrees or less. Preferably, for example, the sum of the angular ranges $\theta 1$, $\theta 3$, $\theta 5$, $\theta 6a$, and $\theta 7$ is about 120 degrees or more and about 180 degrees or less. In the region A4, the sum of the angular ranges $\theta 2$, $\theta 4$, $\theta 6b$, and $\theta 8$ is about 60 degrees or more and about 180 degrees or less. Preferably, for example, the sum of the angular ranges θ2, θ4, θ6b, and θ8 is about 120 degrees or more and about 180 degrees or less.

Figure 6:
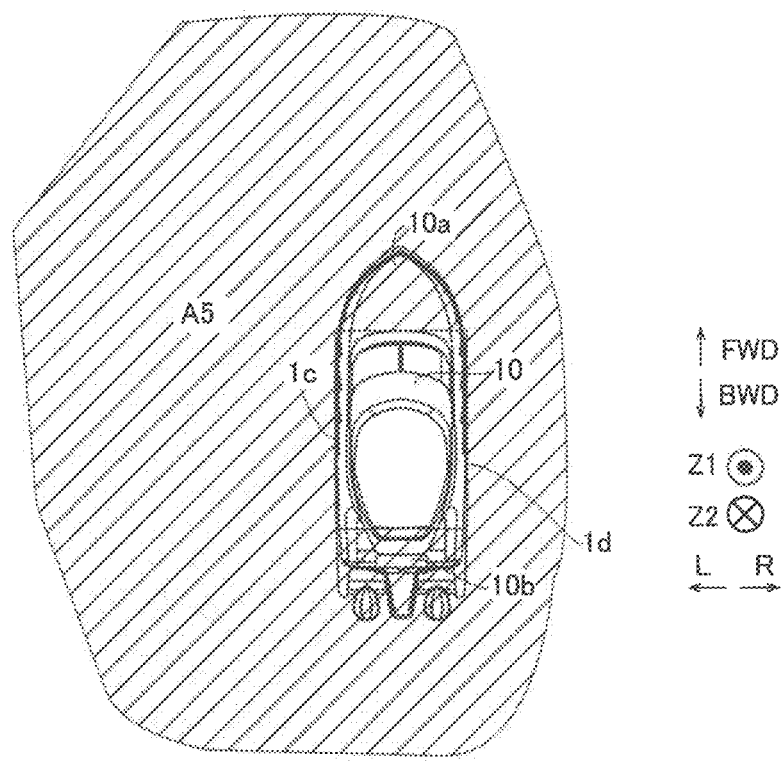
FIG. 6 is a plan view showing the field-of-view shielded region according to the first preferred embodiment of the present invention.

As shown in FIGS. 5 and 6, when the marine vessel operator visually recognizes a position below the horizontal direction from the marine vessel operator's viewpoint Q, a region in which the marine vessel operator's field of view is obstructed by the shield 20 of the cabin 10, the front deck 10a, and the rear deck 10b is defined as a lower field-of-view shielded region A5 (hereinafter referred to as a "region A5"). The "horizontal direction" refers to a direction along a plane parallel or substantially parallel to the water surface W.

Figure 7:
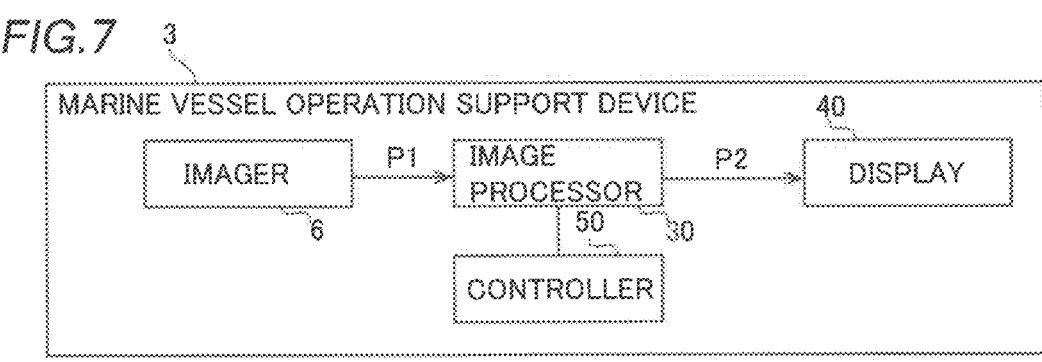
FIG. 7 is a block diagram showing the structure of a marine vessel operation support device according to the first preferred embodiment of the present invention.

As shown in FIG. 7, the marine vessel operation support device 3 is a device that supports the marine vessel operation of the marine vessel operator located on the operation seat 4 inside the cabin 10. Specifically, the marine vessel operation support device 3 includes an imager 6, an image processor 30, a display 40, and a controller 50. In other words, the marine vessel operation support device 3 displays an image captured by the imager 6 on the display 40 when the marine vessel operator operates the marine vessel operation unit 5 (operates the marine vessel) while being located on the operation seat 4 to complement the marine vessel operator's field of view (blind spot).

The imager 6 images the region A (A1 to A5). Furthermore, the imager 6 images at least a portion of each of the regions A1 to A5. Specifically, as shown in FIG. 1, the imager 6 is located on the hull 1 and is provided outward from the hull 1. The imager 6 images the regions A1 to A4 by imaging in all directions (the angular range is about 360 degrees) outward from the hull 1. That is, the imager 6 is a single camera or an omnidirectional camera including a plurality of cameras. The imager 6 images the region A5 by imaging from the upper side of the hull 1 toward the lower side of the hull 1. The imager 6 transmits a captured image P1 (images of the regions A1 to A5) to the image processor 30. In FIG. 1, the imager 6 is located on an upper portion of the cabin 10, but the imager 6 may be provided at any position on the hull 1 as long as the region A is imaged.

The image processor 30 generates a field-of-view complement image P2 to be displayed on the display 40 based on the image P1 of the region A captured by the imager 6. When the captured image P1 is able to be displayed on the display 40, the image P1 and the field-of-view complement image P2 may be the same or substantially the same. Furthermore, the field-of-view complement image P2 may include a bird's-eye view image that shows the periphery of the hull 1 from the upper side toward the lower side in a bird's-eye view.

Figure 8:
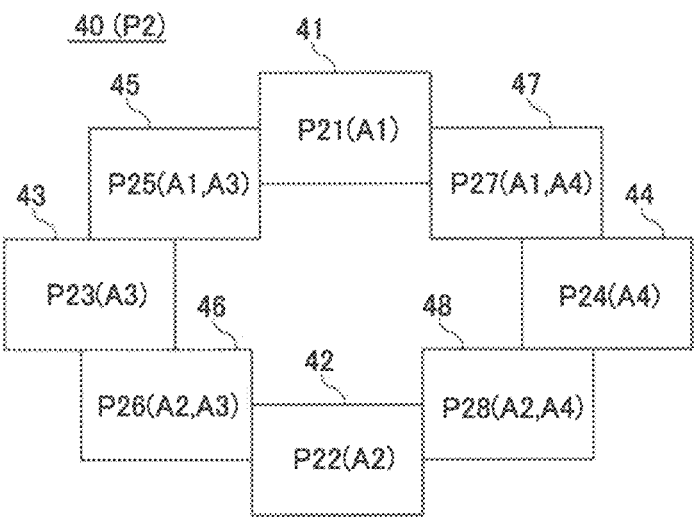
FIG. 8 is a diagram showing the structure of a display according to the first preferred embodiment of the present invention.

For example, as shown in FIG. 8, the image processor 30 generates a front image P21 (the image of the region A1), a rear image P22 (the image of the region A2), and a left image P23 (the image of the region A3), a right image P24 (the image of the region A4), a left front image P25 (the images of the regions A1 and A3) between the left side and the front side, a left rear image P26 (the images of the regions A2 and A3) between the left side and the rear side, a right front image P27 (the images of the regions A1 and A4) between the right side and the front side, and a right rear image P28 (the images of the regions A2 and A4) between the right side and the rear side based on the image P1. That is, the field-of-view complement image P2 includes the front image P21, the rear image P22, the left image P23, the right image P24, the left front image P25, the left rear image P26, the right front image P27, and the right rear image P28. The image processor 30 outputs the generated field-of-view complement image P2 to the display 40 based on a command from the controller 50.

The display 40 is located adjacent to or in a vicinity of the operation seat 4. Specifically, the display 40 is provided inside the cabin 10 and at a position visible from the operation seat 4. The display 40 is provided inside the cabin 10 at a position at which the display 40 is viewable by the marine vessel operator located on the operation seat 4 when the marine vessel operator looks at the outside of the hull 1 at least in a forward and horizontal direction. For example, the display 40 is provided on the operation seat 4 side of the console 5c. The display 40 includes a first portion 41, a second portion 42, a third portion 43, a fourth portion 44, a fifth portion 45, a sixth portion 46, a seventh portion 47, and an eighth portion 48. Furthermore, the first portion 41, the second portion 42, the third portion 43, the fourth portion 44, the fifth portion 45, the sixth portion 46, the seventh portion 47, and the eighth portion 48 may be provided as separate displays, or as different display areas of a single display.

For example, the first portion 41, the second portion 42, the third portion 43, the fourth portion 44, the fifth portion 45, the sixth portion 46, the seventh portion 47, and the eighth portion 48 are provided in an annular shape. Specifically, in the display 40, the first portion 41 is provided at an upper portion, the second portion 42 is provided at a lower portion, the third portion 43 is provided at a left portion, the fourth portion 44 is provided at a right portion, the fifth portion 45 is provided at a portion between the upper side and the left side, the sixth portion 46 is provided at a portion between the lower side and the left side, the seventh portion 47 is provided at a portion between the upper side and the right side, and the eighth portion 48 is provided at a portion between the lower side and the right side.

The display 40 displays the field-of-view complement image P2. For example, the display 40 displays the front image P21, the rear image P22, the left image P23, the right image P24, the left front image P25, the left rear image P26, the right front image P27, and the right rear image P28 at the same time or at substantially the same time. Specifically, the display 40 displays the front image P21 on the first portion 41, displays the rear image P22 on the second portion 42, displays the left image P23 on the third portion 43, displays the right image P24 on the fourth portion 44, displays the left front image P25 on the fifth portion 45, displays the left rear image P26 on the sixth portion 46, displays the right front image P27 on the seventh portion 47, and displays the right rear image P28 on the eighth portion 48.

The controller 50 is a control processing circuit including a central processing unit (CPU) and a memory, for example. The controller 50 controls each portion of the marine vessel operation support device 3. The controller 50 controls the display 40 to display the field-of-view complement image P2 by transmitting a control signal to the image processor 30 and the display 40.

According to the first preferred embodiment of the present invention, the following advantageous effects are able to be provided.

According to the first preferred embodiment, the marine vessel 100 includes the imager 6 that images the region A and the display 40 provided at the position visible from the operation seat 4 and that displays the field-of-view complement image P2, which is the image of the region A. Accordingly, the image of the region A is visually recognized by the marine vessel operator located on the operation seat 4 provided inside the cabin 10, and thus the marine vessel operator's field of view is complemented. Consequently, even when the operation seat 4 is provided inside the cabin 10, marine vessel operator's visibility to the outside of the marine vessel is improved without greatly changing the designs or shapes of structural members of the cabin 10. Furthermore, the operation seat 4 is provided inside the cabin 10, and thus blowing of the wind against the marine vessel operator is significantly reduced or prevented, and the temperature adjacent to or in a vicinity of the operation seat 4 is easily maintained at an appropriate temperature.

According to the first preferred embodiment, the display 40 is located adjacent to or in a vicinity of the operation seat 4. Accordingly, the marine vessel operator located on the operation seat 4 easily visually recognizes the display 40 provided adjacent to or in a vicinity of the operation seat 4.

According to the first preferred embodiment, the imager 6 images at least the region A1. Furthermore, the display 40 displays the field-of-view complement image P2 including the front image P21 of the region A1. Accordingly, the marine vessel operator's field of view is complemented when the marine vessel 100 is traveling forward. Consequently, when the marine vessel operator is operating the marine vessel 100 in the cabin 10 and the marine vessel 100 moves forward (during sailing), the marine vessel operator's visibility to the outside of the marine vessel is improved.

According to the first preferred embodiment of the present invention, the imager 6 images the region A2 in addition to the region A1. Furthermore, the display 40 displays the field-of-view complement image P2 including the front image P21 of the region A1 and the rear image P22 of the region A2. Accordingly, the marine vessel operator's visibility to the outside of the marine vessel not only forward of the hull 1 but also rearward of the hull 1 is improved.

According to the first preferred embodiment, the front window 15a is provided in front of the operation seat 4 in the cabin 10. Furthermore, the region A includes the regions (regions A1 to A4) in which the marine vessel operator's field of view is obstructed when the marine vessel operator looks at the outside of the marine vessel in the horizontal direction from the height of the center position C1 of the front window 15a in the vertical direction above the operation seat 4. Accordingly, the field of view of the marine vessel operator located on the operation seat 4 and who is visually recognizing the front window 15a is complemented. Consequently, the marine vessel operation of the marine vessel operator is effectively supported when the marine vessel travels forward.

According to the first preferred embodiment, the region A includes the regions (regions A1 to A4) obstructed by the shield 20 including the front pillars 12a and 12b of the cabin 10 and the rear wall 14b of the cabin 10. Accordingly, the marine vessel operator's field of view obstructed by the shield 20 of the cabin 10 is complemented. Consequently, the operation seat 4 is provided inside the cabin 10 and, even when the region A is generated due to components or elements of the cabin 10, the marine vessel operator's field of view is effectively complemented.

According to the first preferred embodiment, the sum of the angular ranges $\theta1$ to $\theta8$ of the region A in the horizontal direction around the operation seat 4 in the plan view is about 90 degrees or more and about 360 degrees or less. Accordingly, when the marine vessel operator located on the operation seat 4 looks over in the horizontal direction, the marine vessel operator's field of view is complemented even when the region A is relatively large (for example, even when the sum of the angular ranges $\theta1$ to $\theta8$ is about 90 degrees or more). Consequently, as compared with a case in which the region A is relatively small (for example, the sum of the angular ranges $\theta1$ to $\theta8$ is less than about 90 degrees), the marine vessel operation of the marine vessel operator is more effectively supported.

According to the first preferred embodiment, the sum of the angular ranges $\theta1$ to $\theta8$ of the region A is about 180 degrees or more and about 360 degrees or less. Accordingly, even when the region A is even larger (when the sum of the angular ranges $\theta1$ to $\theta8$ is about 180 degrees or more), the marine vessel operator's field of view is complemented. Consequently, the marine vessel operation of the marine vessel operator is more effectively supported.

According to the first preferred embodiment, the sum of the angular ranges $\theta1$, $\theta2$, and $\theta5$ of the region A1 in the horizontal direction around the operation seat 4 in the plan view is about 60 degrees or more and about 180 degrees or less. Accordingly, even when the region A1 is relatively large (for example, even when the sum of the angular ranges $\theta1$, $\theta2$, and $\theta5$ is about 60 degrees or more), the marine vessel operator's visibility to an area forward of the hull 1 is improved without greatly changing the designs or shapes of the front structural members (the front pillars 12a and 12b, the front wall 14a, etc.) of the cabin 10 and the members provided inside the cabin 10.

According to the first preferred embodiment, the sum of the angular ranges $\theta3$, $\theta4$, $\theta6a$, $\theta6b$, $\theta7$, and $\theta8$ of the region A2 in the horizontal direction around the operation seat 4 in the plan view is about 60 degrees or more and about 180 degrees or less. Accordingly, even when the region A2 is relatively large (the sum of the angular ranges $\theta3$, $\theta4$, $\theta6a$, $\theta6b$, $\theta7$, and $\theta8$ is about 60 degrees or more), the marine vessel operator's visibility to an area rearward of the hull 1 is improved without greatly changing the designs or shapes of the rear structural members (the rear pillars 13a and 13b and the rear wall 14b) of the cabin 10 and the members provided inside the cabin 10.

According to the first preferred embodiment, the sum of the angular ranges $\theta1$, $\theta3$, $\theta5$, $\theta6a$, and $\theta7$ (angular ranges $\theta2$, $\theta4$, $\theta6b$, and $\theta8$) of the region A3 (region A4) in the horizontal direction around the operation seat 4 in the plan view is about 60 degrees or more and about 180 degrees or less. Accordingly, even when the region A3 (region A4) is relatively large (the sum of the angular ranges $\theta1$, $\theta3$, $\theta5$, $\theta6a$, and $\theta7$ (angular ranges $\theta2$, $\theta4$, $\theta6b$, and $\theta8$) is about 60 degrees or more), the marine vessel operator's visibility to an area leftward or rightward of the hull 1 is improved without greatly changing the designs or shapes of the left or right structural members (the left wall 14c or right wall 14d) of the cabin 10 and the members provided inside the cabin 10.

According to the first preferred embodiment, the sum of the angular ranges $\theta1$, $\theta3$, $\theta5$, $\theta6a$, and $\theta7$ (angular ranges $\theta2$, $\theta4$, $\theta6b$, and $\theta8$) of the region A3 (region A4) in the horizontal direction around the operation seat 4 in the plan view is about 120 degrees or more and about 180 degrees or less, for example. Accordingly, even when the region A3 (region A4) is even larger (the sum of the angular ranges $\theta1$, $\theta3$, $\theta5$, $\theta6a$, and (angular ranges $\theta2$, $\theta4$, $\theta6b$, and $\theta8$) is about 120 degrees or more), the marine vessel operator's visibility to the area leftward or rightward of the hull 1 is improved without greatly changing the designs or shapes of the left or right structural members of the cabin 10 and the members provided inside the cabin 10.

Second Preferred Embodiment

The structure of a marine vessel 200 according to a second preferred embodiment of the present invention is now described with reference to FIGS. 9 and 10. In the second preferred embodiment, displays 241 and 242 are located on a shield 20 that generates a region A. In the second preferred embodiment, the same or similar structures as those of the first preferred embodiment are denoted by the same reference numerals, and description thereof is omitted.

Figure 9:
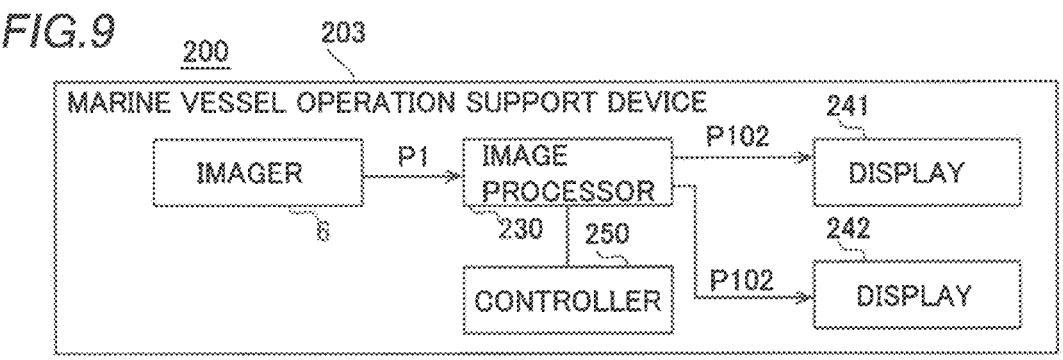
FIG. 9 is a block diagram showing the structure of a marine vessel operation support device according to a second preferred embodiment of the present invention.

The marine vessel 200 includes a marine vessel operation support device 203, as shown in FIG. 9. The marine vessel operation support device 203 includes an image processor 230, the displays 241 and 242, and a controller 250.

Figure 10:
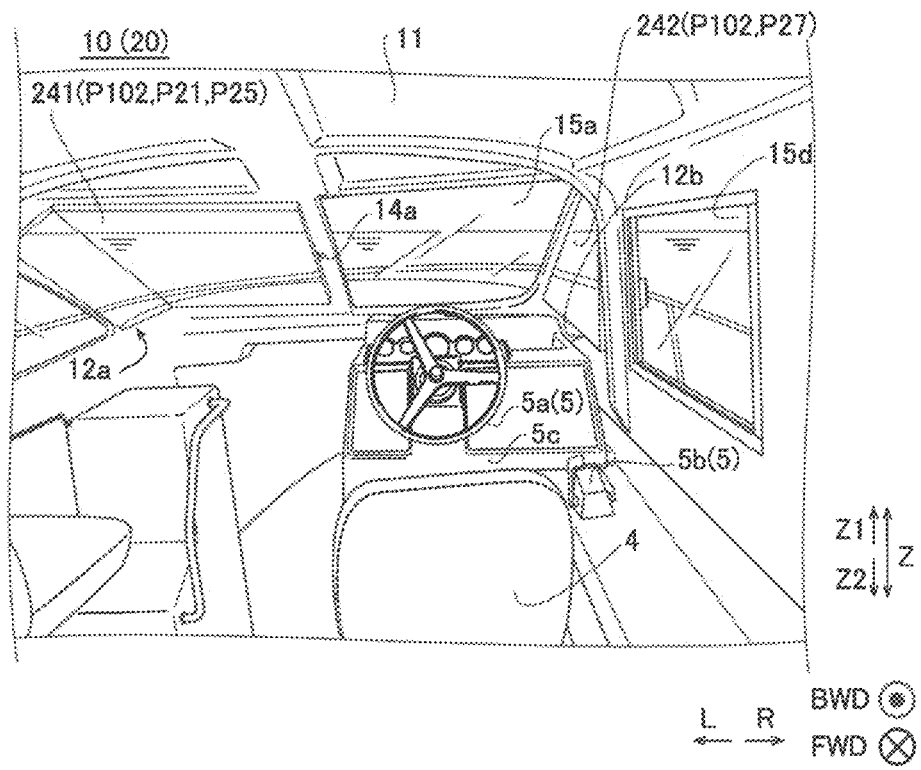
FIG. 10 is a diagram showing the interior of a cabin according to the second preferred embodiment of the present invention.

As shown in FIG. 10, the displays 241 and 242 are located on the shield 20 that generates the region A. The displays 241 and 242 display a field-of-view complement image P102 including an image of the region A generated due to the displays 241 and 242.

Specifically, the display 241 is provided on surfaces of a front pillar 12a and a front wall 14a on the operation seat 4 side (inside a cabin 10). Furthermore, the display 241 displays the field-of-view complement image P102 including a front image P21 and a left front image P25 of regions A1 and A3 generated due to the front pillar 12a and the front wall 14a on which the display 241 is provided.

The display 242 is provided on a surface of a front pillar 12b on the operation seat 4 side (inside the cabin 10). Furthermore, the display 242 displays the field-of-view complement image P102 including a right front image P27 of regions A1 and A4 generated due to the front pillar 12b on which the display 242 is provided.

The image processor 230 generates the field-of-view complement image P102. The controller 250 controls the image processor 230 to output the field-of-view complement image P102 to the displays 241 and 242. The remaining structures of the second preferred embodiment are similar to those of the first preferred embodiment.

According to the second preferred embodiment, the following advantageous effects are able to be provided.

According to the second preferred embodiment, the displays 241 and 242 are provided on the shield 20 that generates the region A. Accordingly, a region in which the shield 20 is provided is effectively used.

According to the second preferred embodiment, the displays 241 and 242 display the field-of-view complement image P102 including the image of the region A generated due to the shield 20 on which the displays 241 and 242 are provided. Accordingly, a marine vessel operator visually recognizes the displays 241 and 242 provided on the shield 20 and thus the marine vessel operator visually recognizes the image corresponding to the region A generated due to the shield 20. Therefore, the marine vessel operator visually recognizes the field-of-view complement image P102 and is able to see through the shield 20, and thus marine vessel operator's visibility to the outside of the marine vessel is further improved.

According to the second preferred embodiment, the displays 241 and 242 are provided on the surface of the shield 20 on the operation seat 4 side. Accordingly, the displays 241 and 242 are provided on the surface of the shield 20 on the operation seat 4 side while the region in which the shield 20 is provided is effectively used such that the marine vessel operator located on the operation seat 4 more easily recognizes the displays 241 and 242. The remaining advantageous effects of the second preferred embodiment are similar to those of the first preferred embodiment.

Third Preferred Embodiment

The structure of a marine vessel 300 according to a third preferred embodiment of the present invention is now described with reference to FIGS. 11 and 12. In the third preferred embodiment, a display 340 is provided over the entire inner periphery of a cabin 10. In the third preferred embodiment, the same or similar structures as those of the first and second preferred embodiments are denoted by the same reference numerals, and description thereof is omitted.

Figure 11:
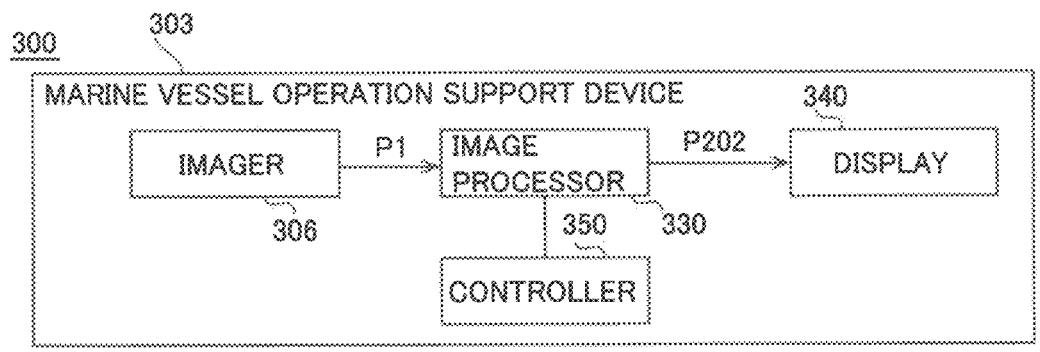
FIG. 11 is a block diagram showing the structure of a marine vessel operation support device according to a third preferred embodiment of the present invention.

As shown in FIG. 11, the marine vessel 300 includes a hull 301 including a cabin 310 and a marine vessel operation support device 303. As shown in FIG. 12, no window is provided in the cabin 310, and the entire periphery is covered by a wall 311. That is, in the third preferred embodiment, all regions outside the cabin 310 become a field-of-view shielded region A10 (hereinafter referred to as a "region A10"). The wall 311 is an example of a "shield".

As shown in FIG. 11, the marine vessel operation support device 303 includes an imager 306, an image processor 330, the display 340, and a controller 350. The imager 306 is provided on a portion of the hull 301 outside the cabin 310 and images the entire region A10.

Figure 12:
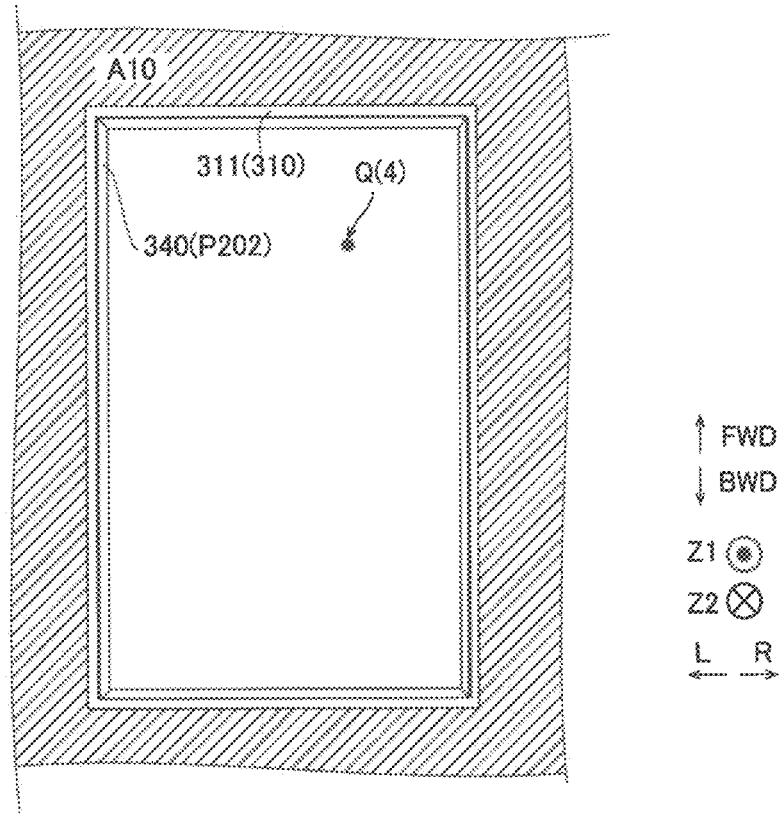
FIG. 12 is a view showing a position at which a display according to the third preferred embodiment of the present invention is provided.

As shown in FIG. 12, the display 340 is provided over the entire inner periphery of the cabin 10. That is, the display 340 is provided inside the cabin 10 at a position at which the display 340 is viewable by a marine vessel operator located on an operation seat 4 when the marine vessel operator looks at the outside of the hull 301 at least in a forward and horizontal direction. The display 340 is provided on the operation seat 4 side of the wall 311 that generates the region A10.

The display 340 displays a field-of-view complement image P202 including an image of the region A10. For example, when the marine vessel operator looks at the display 340 from the operation seat 4, an image of a portion of the region A10 corresponding to a direction in which the marine vessel operator looks is displayed on a portion of the display 340 corresponding to the direction in which the marine vessel operator looks. That is, the display 340 defines and functions as a virtual window. The image processor 330 generates the field-of-view complement image P202. The controller 350 controls the image processor 330 to output the field-of-view complement image P202 to the display 340. The remaining structures of the third preferred embodiment are similar to those of the first preferred embodiment.

According to the third preferred embodiment, the following advantageous effects are able to be provided.

According to the third preferred embodiment, the display 340 is provided inside the cabin 10 at the position at which the display 340 is viewable by the marine vessel operator located on the operation seat 4 when the marine vessel operator looks at the outside of the marine vessel at least in the forward and horizontal direction. Accordingly, the marine vessel operator who is looking forward visually recognizes the display 340. Consequently, the visibility, to the outside of the marine vessel, of the marine vessel operator who is operating the marine vessel while looking forward is improved.

According to the third preferred embodiment, the display 340 is provided over the entire inner periphery of the cabin 10. Accordingly, the marine vessel operator's field of view is complemented over the entire inner periphery (wall 311) of the cabin 10. That is, when looking over the entire inner periphery of the cabin 10, the marine vessel operator visually recognizes the field-of-view complement image P202 showing the entire region A10. The remaining advantageous effects of the third preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the propulsion device is preferably an outboard motor, for example, as shown in FIG. 1, in each of the first to third preferred embodiments described above, the present invention is not restricted to this specific implementation. For example, the propulsion device may alternatively be an inboard motor or an inboard/outboard motor, or a jet propulsion device may alternatively be provided.

While the display(s) is preferably provided, for example, inside the cabin in each of the first to third preferred embodiments described above, the present invention is not restricted to this specific implementation. For example, the display(s) may alternatively be provided outside the front window and at a position visible to the marine vessel operator located on the operation seat.

While at least a portion of each of the regions A1 to A5 is preferably imaged by the imager in the first preferred embodiment described above, for example, the present invention is not restricted to this specific implementation. For example, any one (only the region A1, for example) of the regions A1 to A5 may alternatively be imaged by the imager.

While the sum of the angular ranges in the horizontal direction around the operation seat in the plan view is preferably, for example, about 90 degrees or more and about 360 degrees or less within the field-of-view shielded region in each of the first to third preferred embodiments described above, the present invention is not restricted to this specific implementation. That is, the present invention may alternatively be applied to a marine vessel in which the sum of angular ranges is less than about 90 degrees.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:
a hull including a cabin;
an imager that images a field-of-view shielded region, which is a region in which a marine vessel operator's field of view is obstructed when the marine vessel operator located on an operation seat provided inside the cabin looks around an outside of the marine vessel in a horizontal direction; and
a display provided at a position visible from the operation seat and that displays a field-of-view complement image, which is an image of the field-of-view shielded region captured by the imager; wherein
the imager images at least a front portion of the field-of-view shielded region;
the display displays the field-of-view complement image including an image of the front portion of the field-of-view shielded region;
the cabin includes a window in front of the operation seat; and
the front portion of the field-of-view shielded region includes the region in which the marine vessel operator's field of view is obstructed when the marine vessel operator looks at the outside of the marine vessel in the horizontal direction from a height of a center point of the window in a vertical direction, the center point being located above the operation seat.

2. The marine vessel according to claim 1, wherein the display is located adjacent to or in a vicinity of the operation seat.

3. The marine vessel according to claim 1, wherein
the imager images a rear portion of the field-of-view shielded region in addition to the front portion of the field-of-view shielded region; and
the display displays the field-of-view complement image including the image of the front portion of the field-of-view shielded region and an image of the rear portion of the field-of-view shielded region.

4. The marine vessel according to claim 1, wherein
the imager images a rear portion of the field-of-view shielded region in addition to the front portion of the field-of-view shielded region;
the front portion of the field-of-view shielded region includes a first region obstructed by a front shield including a front pillar of the cabin; and
the rear portion of the field-of-view shielded region includes a second region obstructed by a rear shield including a rear wall of the cabin.

5. The marine vessel according to claim 1, wherein a sum of angular ranges of the field-of-view shielded region in the horizontal direction around the operation seat in a plan view is 90 degrees or more and 360 degrees or less.

6. The marine vessel according to claim 5, wherein the sum of the angular ranges of the field-of-view shielded region is 180 degrees or more and 360 degrees or less.

7. The marine vessel according to claim 1, wherein a sum of angular ranges of the field-of-view shielded region in the horizontal direction around the operation seat in a plan view is 60 degrees or more and 180 degrees or less within the field-of-view shielded region forward of the operation seat.

8. The marine vessel according to claim 1, wherein a sum of angular ranges of the field-of-view shielded region in the horizontal direction around the operation seat in a plan view is 60 degrees or more and 180 degrees or less within the field-of-view shielded region rearward of the operation seat.

9. The marine vessel according to claim 1, wherein a sum of angular ranges of the field-of-view shielded region in the horizontal direction around the operation seat in a plan view is 60 degrees or more and 180 degrees or less within the field-of-view shielded region leftward or rightward of the operation seat.

10. The marine vessel according to claim 9, wherein the sum of the angular ranges of the field-of-view shielded region in the horizontal direction around the operation seat in the plan view is 120 degrees or more and 180 degrees or less within the field-of-view shielded region leftward or rightward of the operation seat.

11. The marine vessel according to claim 9, wherein the display is provided on a shield that generates the field-of-view shielded region.

12. The marine vessel according to claim 11, wherein the display displays the field-of-view complement image including the image of the field-of-view shielded region generated due to the shield on which the display is provided.

13. The marine vessel according to claim 11, wherein the display is provided on a surface of the shield on a side of the operation seat.

14. The marine vessel according to claim 1, wherein the display is provided inside the cabin at a position at which the display is viewable by the marine vessel operator located on the operation seat when the marine vessel operator looks at the outside of the marine vessel at least in a forward and horizontal direction.

15. The marine vessel according to claim 1, wherein the display is provided over an entire inner periphery of the cabin.

16. A marine vessel operation support device comprising:
an imager that images a field-of-view shielded region, which is a region in which a marine vessel operator's field of view is obstructed when the marine vessel operator located on an operation seat provided inside a cabin looks around an outside of a marine vessel in a horizontal direction; and
a display provided at a position visible from the operation seat and that displays a field-of-view complement image, which is an image of the field-of-view shielded region captured by the imager; wherein
the imager images at least a front portion of the field-of-view shielded region;
the display displays the field-of-view complement image including an image of the front portion of the field-of-view shielded region;
the cabin includes a window in front of the operation seat; and
the front portion of the field-of-view shielded region includes the region in which the marine vessel operator's field of view is obstructed when the marine vessel operator looks at the outside of the marine vessel in the horizontal direction from a height of a center point of the window in a vertical direction, the center point being located above the operation seat.

17. The marine vessel operation support device according to claim 16, wherein the display is located adjacent to or in a vicinity of the operation seat.

\* \* \* \* \*